Feb. 9, 1943.    A. C. SCINTA    2,310,751
WINDSHIELD WIPER
Filed May 27, 1940
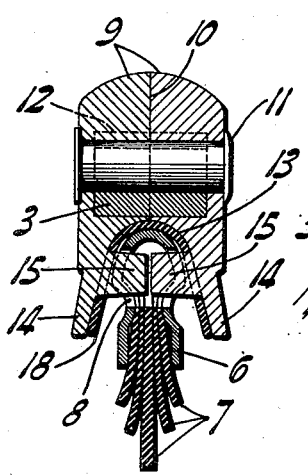
FIG. 3.
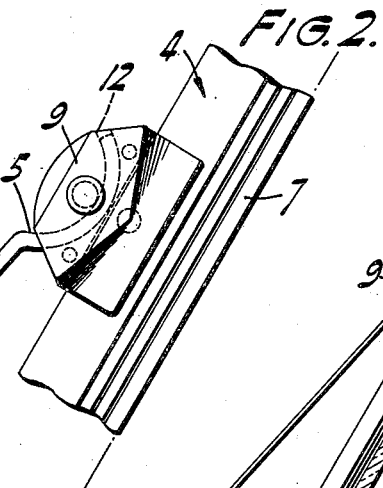
FIG. 2.
FIG. 1.
FIG. 4.
FIG. 5.
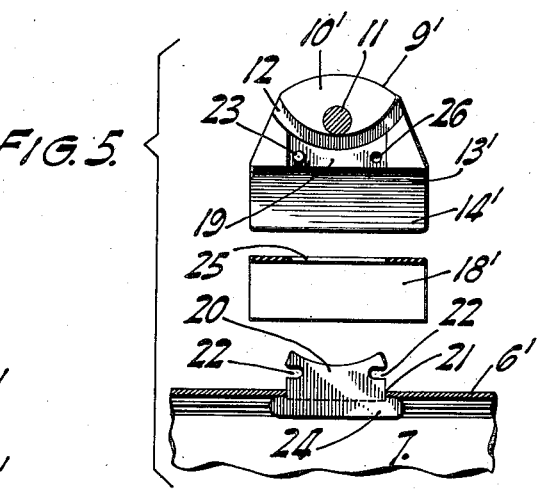
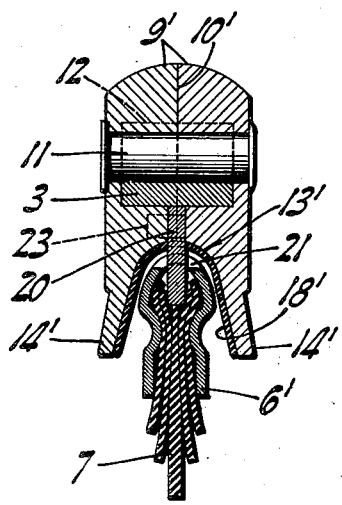
FIG. 6.
INVENTOR
Anthony C. Scinta
BY
Beau, Brooks, Buckley & Beau.
ATTORNEYS Patented Feb. 9, 1943

2,310,751

UNITED STATES PATENT OFFICE 2,310,751

WINDSHIELD WIPER

Anthony C. Scinta, Buffalo, N. Y., assignor to Trico Products Corporation, Buffalo, N. Y.

Application May 27, 1940, Serial No. 337,351

5 Claims. (Cl. 15—250)

This invention relates to the art of windshield cleaning and more particularly to the wiper or squeegee and the mode of attachment to its actuating arm.

Heretofore the wiper blade has been attached to its actuating arm by means of a sheet metal clip or device carried by the blade, with provision being made in its attachment to the arm for permitting the blade to rock to a trailing or dragging position at the beginning of its stroke so that the wiping edge will clean and lap the glass surface for clearer vision. Being of sheet metal the attaching parts sometimes become deformed during shipment or before installation whereby the factory prescribed freedom in the mounting would be altered and result in a chattering action of the blade and a blurred field of vision.

The present invention has for its object to provide an improved wiper unit by which the maintenance of the factory specifications is insured for greater wiping efficiency when sold to the ultimate user. More specifically, and in accordance with the illustrated embodiments, the present invention comprises a die cast clip of substantial construction having a pair of cast sections which are mechanically interlocked with the wiper blade in a definite relationship upon assembling into a salable unit.

In the drawing

Fig. 1 is a side elevation of the improved wiper operatively applied to a windshield, the related parts being shown in fragment;

Fig. 2 is an enlarged fragmentary side elevation of the wiper and its arm more clearly depicting the clip;

Fig. 3 is a transverse sectional view therethrough;

Fig. 4 is a detailed elevation of one of the clip sections;

Fig. 5 is an exploded view illustrating a modified form of the invention; and

Fig. 6 is a transverse sectional view through the modified embodiment.

Referring more particularly to the accompanying drawing the numeral 1 designates the windshield, 2 a shaft suitably journaled in the frame thereof for oscillating the connected arm 3 to move the wiper 4 over the glass surface, the outer terminal of the arm being preferably formed on a radius, as indicated at 5. The wiper blade 4 may be of the usual construction, consisting of a channeled holder 6 embracing the back margin of a rubber wiping body 7, with the holder being formed with a transverse opening or recess 8 to facilitate the attachment to the actuating arm 3.

The attaching clip, in accordance with the present invention, is substantial and rugged in construction so as not to become readily deformed during handling or use. In the form shown in Figs. 1 through 4 the clip comprises a pair of cast sections 9 economically produced by a simple die casting operation and securely united by a suitable fastener 11. The abutting faces 10 are formed with arcuate channels 12 having a radius substantially the same as the arm terminal 5 so that the resulting tunnel will conformably receive such arm terminal upon movement of the blade about the center of curvature. Preferably the clip receives the arm terminal with rather a snug fit so as to hold the latter against any substantial lateral rocking on the arm. The clip is also provided with a blade receiving seat 13 and blade straddling parts 14 defining side walls for the seat. These walls may flare outwardly, as shown in Fig. 3, to define the extent of lateral rocking motion of the blade in its seat, and are each formed with a projecting pin 15 adapted freely to enter the transverse opening 8 of the blade. The pins may be arranged on the same axis so that when the clip sections or halves 9 are assembled they will enter the blade opening 10 in proper alinement for supporting the blade in the desired manner. Each clip section may also be provided with a dowel pin 16 and a pin receiving opening 17 to facilitate and secure the proper alinement of the sections. By this arrangement the sections are substantially identical in design and construction and consequently any two sections may be readily combined to produce the clip. For silencing effect a liner 18 may be arranged in the seat with openings permitting passage of the blade anchoring pins 15.

In the modified embodiment of Figs. 5 and 6 the seat 13' has an extension as provided by the recesses 19 formed in the abutting faces 10' of the clip sections, this seat extension being designed to receive a blade carried part in the form of an attaching fin 20 projecting from the back of the blade. This blade carried part is inserted through a slot 21 in the channeled holder 6' and formed with one or more marginal recesses 22 for interlockingly receiving the anchoring pins 23 when the clip sections are assembled and united by the fastener 11. The fin may be struck from sheet metal and formed with an enlarged base 24 about which the blade may rock in the seat 13', the liner 18' having an opening 25 to pass the fin and thereby interlock itself in position. The anchoring pins 23 in this modified embodiment serve the added function of dowel pins, each section being equipped with one pin and one pin receiving opening 26 to aline the clip sections.

In both illustrated forms of the invention it will be observed that the clip may readily be formed by simple die casting operations. The clip being thus formed, is strong and durable and will maintain for the unit the factory specifications as to clearances by means of which the blade will have the desired freedom of movement for the greatest wiping efficiency. The wiper unit embodying the die cast clip is permanent in its make-up but nevertheless the blade itself is given its factory prescribed freedom which is insured throughout the life of the unit by reason of the heavier die cast formation of the clip, wherein the blade straddling parts 14, 14' are rugged and not deformable. The anchoring pins 15, 23 are factory set and located against being tampered with. It is obvious, therefore, that the unit will retain its factory given clearances for a prolonged usefulness.

While the foregoing disclosure has been given in detail it is not the intention thereby to limit the invention, since the inventive principles thereof are capable of assuming other physical embodiments without departing from the spirit of the invention or its scope defined by the appended claims.

What is claimed is:

1. An arm attaching clip consisting of a pair of sections having abutting mating faces with parts straddling the back of a wiping body and forming a seat therefor, said faces having registering channels defining a tunnnel to receive the free end of an actuating arm, and a fastener connecting the two sections together at a point immediately adjacent one transverse wall of the tunnel, the fastener having terminal parts overlying the outer faces of the two sections under a clamping pressure at points on opposite sides of the tunnel and in the plane of the aforesaid transverse wall of the tunnel to receive support from the latter whereby the two sections are backed by the terminal parts in direct opposition to any stress placed upon the sections by an attached arm tending to separate the sections.

2. A wiper unit comprising a pair of sections having abutting faces with mating channels to form a tunnel for detachably receiving a like shaped terminal of an actuating arm, said sections also having a blade receiving seat with side walls, one side wall carried by each section with a retaining pin extending inwardly therefrom, a liner conforming to the seat and held thereon by and through an interlocking engagement with the retaining pins, a wiping blade engaged with the lined seat and having lateral recesses freely interlocking with the pins in a manner to permit the blade rocking on its seat, the pins having sufficient play in the recesses to permit such rocking engagement of the blade with its seat, and means securing the sections together to interlock the blade therewith as a unit.

3. A clip having means for attachment to an actuating arm and comprising complemental sections having abutting faces defining a blade receiving seat with side walls to limit the freedom of rocking movement of an engaged blade, the abutting faces further defining a fin receiving recess leading from the seat.

4. A wiper for windshield cleaners, comprising a wiping body, and an arm attaching clip consisting of a pair of cast sections having abutting mating faces with parts straddling the back of the wiping body and forming a seat therefor, said faces having registering channels defining a tunnel to receive the free end of an actuating arm, each face having a recess leading from the seat, and a fin extending from the back of the wiping body and clampingly embraced by the face recesses.

5. A wiper for windshield cleaners, comprising a wiping body, and an arm attaching clip consisting of a pair of cast sections having abutting mating faces with parts straddling the back of the wiping body and forming a seat therefor, said faces having registering channels defining a tunnel to receive the free end of an actuating arm, each face having a recess leading from the seat, a fin extending from the back of the wiping body and clampingly embraced by the face recesses, and dowel means for registering the channels and recesses, said fin having a part interengageable with the dowel means to secure the wiping body in position.

ANTHONY C. SCINTA.